July 13, 1954      E. M. GREER      2,683,467
PISTON ACCUMULATOR
Filed May 23, 1952
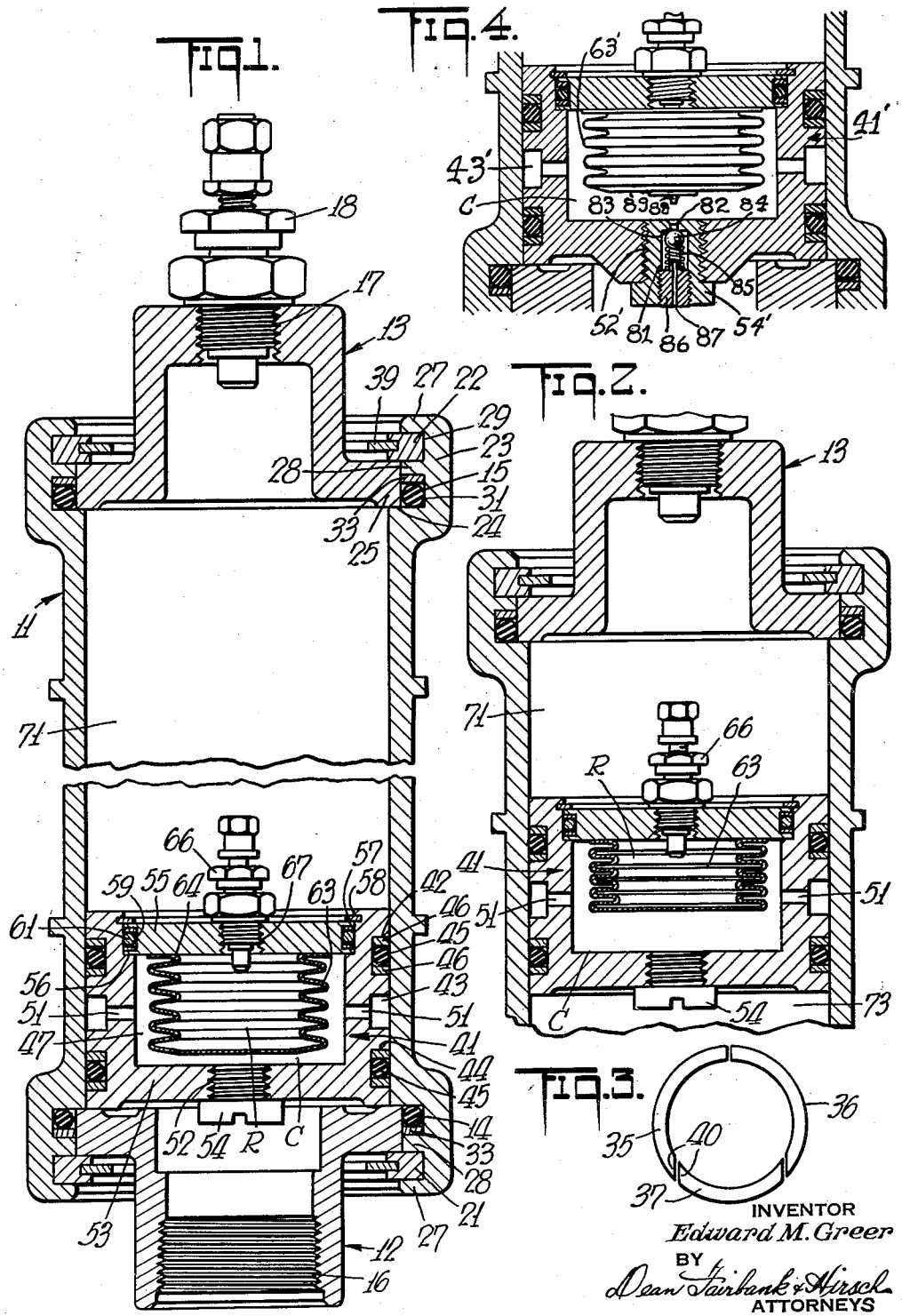
INVENTOR
*Edward M. Greer*
BY
*Dean Fairbank & Hirsch*
ATTORNEYS Patented July 13, 1954

2,683,467

UNITED STATES PATENT OFFICE 2,683,467

PISTON ACCUMULATOR

Edward M. Greer, Great Neck, N. Y., assignor to Greer Hydraulics, Inc., a corporation of New York Application May 23, 1952, Serial No. 289,686

10 Claims. (Cl. 138—31)

This invention relates to piston type pressure accumulators and more particularly to the piston seal between the gas and liquid chambers of the accumulator.

Where the piston seal between the gas and liquid chambers of a piston type pressure accumulator is not dependable, the resultant leakage of liquid, which generally is an oil, past said seal necessitates frequent servicing of the accumulator to drain this oil from the gas chamber.

As a result, the equipment in which the accumulator is installed must be specially designed so that the drain outlet of the accumulator is readily accessible and the accumulator and associated equipment must also be specially designed to enable removal of the oil from the gas chamber of the accumulator with a minimum loss of the gas charge.

It is also possible with such defective piston seal for the gas to leak into the oil chamber and enter the hydraulic system. This might be detrimental to the proper functioning of the unit to be operated by the accumulator, such as, for example, the hydraulic brakes of an aircraft, which would not operate dependably if a gas bubble entered the unit.

Where a single O ring type of seal is used for the piston, the effectiveness of such seal is poor when the pressure on both sides of the piston is identical, as is usually the case in piston type accumulators, for such seal only operates effectively when there is a greater pressure on one side than the other, which will force the O ring toward the low pressure side into the space between the piston and the adjacent wall of the accumulator to create an effective seal.

Where two O rings are used on a piston on each side of an annular groove therein, in an attempt to secure a differential between the pressure on opposite sides of the rings, it has been found that the wiping action of one seal results in a dry smooth surface for the second seal to slide upon. As a result, the second seal produces considerable friction and soon breaks down with resultant leakage of oil to the other side of the first seal. As a result the pressure on both sides of the first seal is equalized with resultant inoperativeness of such seal.

Where, to offset this condition, oil is introduced directly into the annular groove from the oil chamber of the accumulator, although the friction is reduced, the pressure on both sides of both seals will be identical and hence the seals will be ineffective for the reasons heretofore set forth.

It is accordingly among the objects of the invention to provide sealing means for the piston of a piston type pressure accumulator which will dependably prevent passage of liquid or gas therepast, yet will provide constant lubrication on the surface over which the piston seal slides so that the latter may be used for long periods with but a minimum of wear, which seal has but few parts, none of which are delicate or likely to become out of order and which may readily be assembled and disassembled for cleaning and maintenance.

According to the invention, a pair of resilient seals encompasses the periphery of the piston of a piston type accumulator and are positioned on each side respectively of an annular groove in the periphery of said piston. Means are provided to charge the groove with liquid such as grease or oil and to apply a pressure on such grease which is less than the pressure in the oil and gas chamber of the accumulator.

More specifically, the piston has a chamber therein which is in communication with the annular groove in the periphery of the piston. The chamber, which may be charged with grease or oil in any suitable manner, desirably has a deformable gas reservoir therein which may be charged to any desired pressure to exert a corresponding pressure on the grease or oil in the chamber to force the latter into the annular groove.

This application is a continuation-in-part of copending application, Serial No. 224,220 filed May 2, 1951.

In the accompanying drawings in which is shown one or more of various possible embodiments of the several features of the invention, Fig. 1 is a longitudinal sectional view of the device prior to charging of the reservoir and chamber, Fig. 2 is a fragmentary view similar to Fig. 1 with the reservoir and chamber charged, Fig. 3 is a plan view of a typical retaining ring which may be used in the device, and Fig. 4 is a fragmentary view similar to Fig. 1 of another embodiment of the invention.

Referring now to the drawings, the pressure accumulator desirably comprises a substantially cylindrical container or casing 11 which preferably has plugs 12 and 13 removably mounted at each end thereof and provided with suitable substantially identical seals 14 and 15 respectively to prevent leakage from the casing 11. One of said plugs, illustratively plug 12 has an oil port 16 therein which may be connected by a suitable coupling (not shown) to the equipment to be operated by the accumulator and the other of said plugs, illustratively plug 13 has an air inlet port 17 therein with a suitable valve 18 controlling the same.

Although the plugs 12 and 13 could be retained in the casing 11 in any suitable manner, in the illustrative embodiment herein shown, retaining rings 21 and 22, which may be identical, are provided for this purpose, associated respectively with the plugs 12 and 13.

As shown in Fig. 1, the casing 11 is desirably of enlarged diameter at each end as at 23 defining an annular shoulder 24. The plugs 12 and 13 which are positioned in the enlarged portions 23 of the casing are substantially cup-shaped and each has an annular lateral flange 25 which may be seated on the associated shoulder 24. Each of the enlarged portions 23 of the casing 11 desirably has a pair of spaced inturned annular flanges 27 and 28 which define annular grooves 29 and 31, the seals 14 and 15, which are desirably resilient O rings of conventional type and encompass the periphery of the associated flange 25, being positioned in the associated groove 31, a split ring washer 33 also being provided in each of the grooves 31 preferably against the associated flange 28.

Retaining rings 21 and 22 each preferably comprises a plurality of rigid arcuate segments illustratively three in number and designated 35, 36 and 37, the segments when assembled in the associated annular groove 29 forming an annulus. The arcuate segments desirably have their adjacent ends 40 parallel to a line extending diametrically across the annulus so that they may readily be inserted into the associated annular groove 31 and are retained in said groove by means of a snap ring 39 which coacts with the inner peripheries of the segments and is stressed to urge such segments into the associated groove 29. The segments of each retaining ring 21, 22 are of greater width than the depth of the associated annular groove 29 and overlap the lateral flanges 25 of the associated plugs 12 and 13 securely to retain said plugs against the associated shoulder 24.

The construction of the retaining ring above described per se forms no part of the present invention as any suitable retaining ring may be used.

According to the present invention, a substantially cylindrical piston 41 which has an outer diameter slightly less than the inner diameter of the casing so that it may slide therein is positioned in the cylinder between ports 16 and 17. Piston 41 desirably has a plurality of spaced annular grooves in its outer periphery, illustratively three in number, designated by the numerals 42, 43 and 44. Each of the grooves 42 and 44 has a seal member 45 therein respectively, preferably of the O ring type which may be positioned between a pair of washers 46, preferably of deformable leather.

The piston 41 has a cylindrical bore 47 extending longitudinally therethrough defining a chamber C in communication with annular groove 43 as by means of a plurality of lateral passageways 51 which extend through the wall of piston 41. The chamber C may be charged with a suitable oil or grease through an axial port 52 in the end wall 53 of the piston, said port being normally closed by a threaded plug 54.

In order to close chamber C, a plug 55 is seated on a shoulder 56 formed by an enlargement of bore 47 and retained on said shoulder as by means of a split ring 57 positioned in an annular groove 58 in the enlarged portion of bore 47. Desirably the periphery of plug 55 has an annular groove 59 therein in which a seal ring 61, preferably of the O ring type, is positioned to provide a liquid tight seal.

Positioned in chamber C is a deformable gas reservoir R desirably a collapsible and expansible bellows 63, the mouth 64 of which is affixed in any suitable manner as by welding to the inner surface of plug 55. The reservoir R may be charged with any suitable gas under pressure through a valve 66 threaded into an axial bore 67 in plug 55.

In the operation of the device, with the air valve 66 open and with plug 13 removed, a supply of grease or oil is injected through open port 52 by means of a suitable grease gun or the like to charge the chamber C, lateral passageways 51 and annular groove 43, and the port 52 is thereupon sealed by plug 54. As the grease is forced into the chamber C, the deformable bellows 63 will be collapsed as shown in Fig. 2. In this condition, the grease or oil in chamber C, passageways 51 and annular groove 43 will be under only atmospheric pressure. The bellows 63 is thereupon charged with air or other gas through valve 66, to a pressure of say 100 p. s. i. and a corresponding pressure will be exerted on the grease or oil in chamber C, passageways 51 and annular groove 43. The plug 13 is then mounted on the enlarged end 23 of the cylinder.

With the chamber 71 of the casing between piston 41 and plug 13 pre-charged with air through valve 18 to a pressure of say 1,000 p. s. i., oil is thereupon forced through the oil port 16 under a pressure greater than 1,000 p. s. i. As a result of such pressure against the adjacent surface of the piston 41, the latter will move axially as the oil fills the oil chamber 73 between oil port 16 and piston 41 to decrease the volume of the air chamber 71, thereby compressing the air therein. Assuming that the oil is applied under a pressure of say 3,000 p. s. i., the piston 41 will be displaced until the air in chamber 71 has been compressed to a pressure of 3,000 p. s. i., at which time the piston will be in a position of equilibrium as the pressure against both surfaces of the piston will be equal.

Although the pressures on both surfaces of the piston 41 are equal, i. e., 3,000 p. s. i. in the embodiment herein shown, as the charged bellows 63 is exerting a pressure of only 100 pounds on the grease or oil in chamber C, passageways 51 and annular groove 43, there will be a greater pressure against the sides of the O rings exposed to the pressure of the oil and gas from the chambers 73 and 71 than against the sides of the O rings adjacent groove 43. Consequently, the O rings will be deformed and forced towards each other, pressing against the space between the outer wall of the piston and the adjacent wall of the casing, thereby to effect a highly efficient seal.

In addition, the use of the grease or similar lubricant in annular groove 43 serves to lubricate the inner wall of the cylinder so that as the piston 41 moves therealong, there will be but a minimum of friction and hence the seals 45 will be longlasting.

Under certain conditions of operation such as where high temperatures are encountered, the oil in the system may become very viscous. As a result, as the piston 41 slides in the casing 11, oil may seep past the O rings 45 into chamber C. Such seepage may also occur as the O rings wear with continuous use.

The seepage of oil into the chamber C will gradually cause the pressure therein to rise until it reaches the same value as the pressure on each side of the piston 41. This would reduce the effectiveness of the O rings as a seal.

In order to bleed the chamber C, the construction shown in Fig. 4 is provided. As this construction is substantially identical to that shown in Figs. 1 to 3, corresponding parts will have the same reference numerals primed.

In the embodiment shown in Fig. 4, the port 52' is sealed by means of a plug 54' screwed into said port. The plug 54' desirably has an axial bore 81 of reduced diameter at its inner end as at 82 forming a seat 83. Positioned in bore 81 is a ball 84 normally retained on its seat 83 by a coil spring 85 compressed between the ball 84 and a screw 86 affixed in bore 81 and having an axial bore 87 therethrough.

The bellows 63' shown in Fig. 4 is substantially identical to the bellows 63 shown in Figs. 1 to 3 and has a plug 88 affixed to its undersurface 89 and adapted to seal the reduced end 82 of bore 81.

In the operation of the embodiment shown in Fig. 4 chamber C' is charged with oil and with the bellows normally charged with gas at a pressure of 100 p. s. i., the tension of coil spring 85 is selected to exert a force sufficient to retain ball 84 on its seat 83.

As the pressure on both sides of piston 41' is normally the same and greater than 100 p. s. i., the ball 84 will be retained on its seat. If the pressure in chamber C' should build up to the same value as the pressure on each side of the piston 41' the effectiveness of the O ring seals would be reduced.

If at such time, a valve controlling the oil port of the accumulator should be opened to operate a hydraulic device, the pressure against the oil side of the piston 41' would instantaneously be reduced considerably. As a result, due to the fact that the gas in bellows 63' has been compressed to the same value as the pressure on the gas side of the piston 41', the oil in chamber C' being under such pressure would move the ball 84 off its seat and such oil would bleed from chamber C' into the oil chamber below. Such bleeding of oil would occur rapidly and continue until plug 88 sealed port 82 to insure that oil would remain in chamber C'.

As a result of such bleeding, the pressure in chamber C' would fall to provide the required differential of pressure between annular groove 43' and the oil and gas chambers, when the pressure on the oil in the oil chamber stabilized at the pressure of the oil in the air chamber.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure accumulator comprising a cylinder, having a gas inlet port and a liquid port, whereby said accumulator may be charged with gas and liquid, a piston slidably mounted in said cylinder intervening between said ports and defining a gas chamber and a liquid chamber, a pair of spaced annular grooves in the periphery of said piston, a resilient deformable annular seal in each of said grooves engaging the inner wall of said cylinder, a chamber in said piston, said chamber having an inlet providing communication thereto for charging with fluid, a third annular groove in the periphery of said piston between said pair of annular grooves, a passageway between said third annular groove and said piston chamber, and a deformable and compressable member in said chamber.

2. The combination set forth in claim 1 in which said resilient seals each comprises an O ring.

3. A pressure accumulator comprising a cylinder having a gas inlet port and a liquid port, whereby said accumulator may be charged with gas and liquid, a piston slidably mounted in said cylinder intervening between said ports and defining a gas chamber and a liquid chamber, a pair of spaced annular grooves in the periphery of said piston, a resilient deformable annular seal in each of said grooves engaging the inner wall of said cylinder, said piston having an axial bore defining a chamber, and having a port in one end wall thereof providing communication to said chamber, a third annular groove in the periphery of said piston between said pair of annular grooves, a passageway between said third annular groove and said chamber, a deformable reservoir in said chamber and a gas inlet port in communication with said reservoir for charging thereof.

4. The combination set forth in claim 3 in which the axial bore defines an opening in the other end wall of said piston and a plug is affixed in said opening to seal the latter.

5. The combination set forth in claim 3 in which the axial bore defines an opening in the other end wall of said piston, a plug is affixed in said opening to seal the latter, and said reservoir comprises a bellows affixed to said plug, said plug having a gas inlet leading into said reservoir.

6. The combination set forth in claim 3 in which a plug is positioned in the port in the end wall of said piston, said plug having a bore therethrough of reduced diameter at its inner end forming a ball seat, a ball positioned in said bore, and a coil spring normally retaining said ball on said seat.

7. The combination set forth in claim 6 in which said reservoir comprises a bellows, said bellows having a plug at one end adapted to seal the reduced end of said bore.

8. The combination set forth in claim 3 in which the axial bore defines an opening in the other end of said piston, said axial bore being of enlarged diameter to define a shoulder, a plug is seated on said shoulder to seal the opening and means provided to retain the plug on said shoulder.

9. The combination set forth in claim 8 in which said plug has an annular groove in the periphery thereof, and a deformable ring is positioned in said groove to provide a liquid tight seal between the plug and the wall of said bore.

10. The combination set forth in claim 8 in which the enlarged portion of said bore has an annular groove and the means to retain the plug on said shoulder comprises a split ring in said annular groove extending laterally beyond the periphery of said plug.

References Cited in the file of this patent

UNITED STATES PATENTS

| Number | Name | Date |
| --- | --- | --- |
| 2,349,253 | Edmund | May 23, 1944 |
| 2,440,065 | Ashton | Apr. 20, 1948 |
| 2,592,613 | Snyder | Apr. 15, 1952 |